United States Patent
Yang et al.

(10) Patent No.: US 12,553,334 B2
(45) Date of Patent: Feb. 17, 2026

(54) SOLVING METHOD AND SYSTEM FOR EULER ANGLE ATTITUDE

(71) Applicant: Institute of Geology and Geophysics, Chinese Academy of Sciences, Beijing (CN)

(72) Inventors: Yongyou Yang, Beijing (CN); Kanggui Wei, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 425 days.

(21) Appl. No.: 18/355,323

(22) Filed: Jul. 19, 2023

(65) Prior Publication Data
US 2024/0401467 A1 Dec. 5, 2024

(30) Foreign Application Priority Data
Jun. 5, 2023 (CN) .......................... 202310656865.2

(51) Int. Cl.
*E21B 47/024* (2006.01)
*G01B 21/22* (2006.01)
(52) U.S. Cl.
CPC ............ *E21B 47/024* (2013.01); *G01B 21/22* (2013.01)
(58) Field of Classification Search
CPC .............................. E21B 47/024; G01B 21/22
See application file for complete search history.

(56) References Cited

FOREIGN PATENT DOCUMENTS

| CN | 108549322 A | * | 9/2018 | ......... G05B 19/4086 |
|---|---|---|---|---|
| CN | 109460052 A | | 3/2019 | |
| CN | 109857146 A | | 6/2019 | |
| CN | 119062320 A | * | 12/2024 | ........... E21B 47/024 |
| KR | 20210116248 A | * | 9/2021 | ............... G05D 1/65 |

* cited by examiner

*Primary Examiner* — Michael J Dalbo
*Assistant Examiner* — Kaleria Knox
(74) *Attorney, Agent, or Firm* — Nitin Kaushik

(57) ABSTRACT

The present disclosure discloses a solving method and system for an Euler angle attitude. The solving method includes: acquiring a rough rotation angle ΔT of a tool surface of a drilling tool in a search interval; performing calculation according to the rough rotation angle ΔT to obtain a variation range RangeT of the tool surface; disposing a plurality of particles within the variation range RangeT, corresponding position coordinates of the particles to an Euler angle value, randomly generating initial speeds of the particles, calculating a fitness function of each particle, and selecting the particle with the minimum fitness function as an optimal particle; updating a speed and a position of each particle, and gradually moving the particles closer to an optimal position by adopting an iteration method; and after performing n iterations until the precision of the fitness function of the optimal particle reaches a threshold.

7 Claims, 1 Drawing Sheet

```
Acquiring a rough rotation angle ΔT of a tool surface of    ── S100
a drilling tool in a search interval
                    ↓
Performing calculation according to the rough rotation      ── S200
angle ΔT to obtain a variation range RangeT of the tool
surface
                    ↓
Disposing a plurality of particles within the variation
range RangeT, corresponding position coordinates of the
particles to an Euler angle value, randomly generating      ── S300
initial speeds of the particles, calculating a fitness
function of each particle, and selecting the particle with
the minimum fitness function as an optimal particle
                    ↓
Updating a speed and a position of each particle, and       ── S400
gradually moving the particles closer to an optimal
position by adopting an iteration method
                    ↓
After performing n iterations until the precision of the
fitness function of the optimal particle reaches a
threshold, that is, the position of the particle is the     ── S500
optimal position, stopping iteration, and at the moment,
taking a position of a first particle as a real altitude
parameter of the drilling tool
```

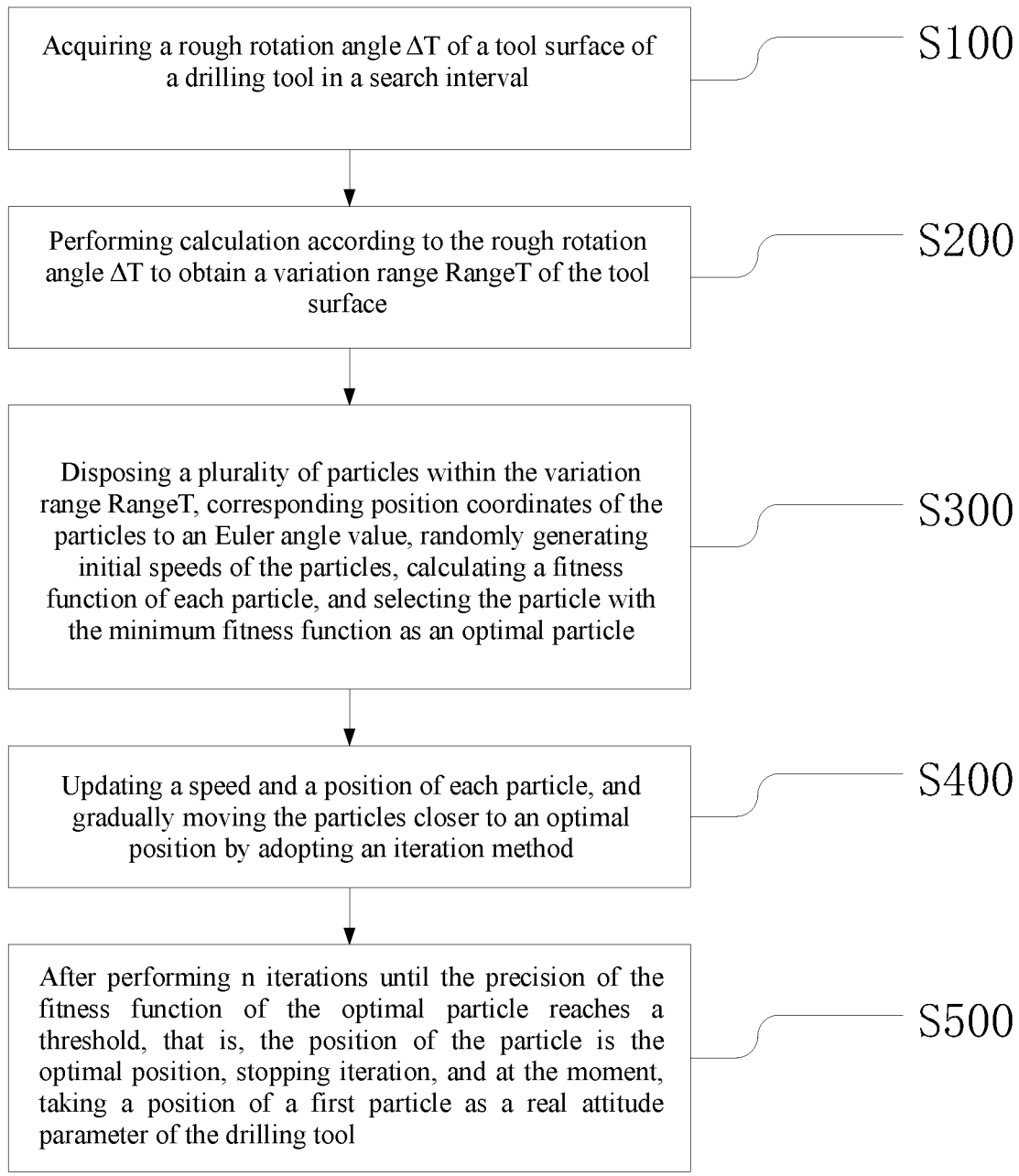

SOLVING METHOD AND SYSTEM FOR EULER ANGLE ATTITUDE

CROSS-REFERENCE TO RELATED APPLICATIONS

The application claims priority to Chinese patent application No. 2023106568652, filed on Jun. 5, 2023, the entire contents of which are incorporated herein by reference.

TECHNICAL FIELD

The present disclosure belongs to the technical field of structural tests, in particular relates to a solving method and system for an Euler angle attitude.

BACKGROUND

A rotary steerable drilling system is a new advanced automatic drilling technology, which can complete a steering function in real time while drilling, and plays an important role in resource exploration. The solution for attitude parameters of a drilling tool is a key part of a rotary steerable drilling technology, and is related to the attitude control of a downhole tool and the tracking control of a wellbore track. Common attitude calculation methods include an Euler angle method, a direction cosine method, a quaternion method, an equivalent rotation vector method, etc.

The Euler angle method is also referred to as a three-parameter method, that is, if a carrier is located in a reference coordinate system at an initial time, a process that the carrier performs a rotation action for three times in order can be described by three direction cosine matrices, attitude information of the carrier can be represented by different angles obtained by rotation for three times along different coordinate axes, and the three angles are referred to as Euler angles. The above-mentioned solution is used for measuring and solving a deviation angle, a tool surface angle and an azimuth angle of the drilling tool. However, it is only applicable to measurement when the drilling tool is static, that is, drilling is stopped during attitude measurement (the drilling tool does not vibrate or rotate), which is due to a fact that severe vibration will be caused during drilling to make measured data from an accelerometer unavailable. Such an attitude measuring method is low in time efficiency and high in drilling cost, and makes it difficult to realize continuous, dynamic and real-time measurement for attitude parameters of the drilling tool.

SUMMARY

(1) Objectives of Invention

The objectives of the present disclosure are to provide a solving method and system for an Euler angle attitude to solve the above-mentioned problems.

(2) Technical Solutions

In order to solve the above-mentioned problems, a first aspect of the present disclosure provides a solving method for an Euler angle attitude, including: acquiring a rough rotation angle $\Delta T$ of a tool surface of a drilling tool in a search range; performing calculation according to the rough rotation angle $\Delta T$ to obtain a variation range RangeT of the tool surface; disposing a plurality of particles within the variation range RangeT, corresponding position coordinates of the particles to an Euler angle value, randomly generating initial speeds of the particles, calculating a fitness function of each particle, and selecting the particle with the minimum fitness function as an optimal particle; updating a speed and a position of each particle, and gradually moving the particles closer to an optimal position by adopting an iteration method; and after performing n iterations until the precision of the fitness function of the optimal particle reaches a threshold, that is, the position of the particle is the optimal position, stopping iteration, and at the moment, taking a position of a first particle as a real attitude parameter of the drilling tool; wherein the optimal position is a position where the value of the fitness function is less than the threshold.

Further, the particles include fixed particles and random particles;
the fixed particles are disposed in the center and on endpoints of the search range;
the random particles are randomly generated in the search range.

Further, the acquiring a rough rotation angle $\Delta T$ of a tool surface of a drilling tool in a search range includes:
acquiring a rough rotation angle $\Delta T$ according to a rotating speed v of the drilling tool;
a specific formula being expressed as:

$$\Delta T = v * \frac{60}{f};$$

wherein f is a sampling frequency.

Further, the performing calculation according to the rough rotation angle $\Delta T$ to obtain a variation range RangeT of the tool surface includes: performing calculation according to the rough rotation angle $\Delta T$ and an angle Tf before rotation to obtain the variation range RangeT of the tool surface.

Further, a calculation formula includes:

$$RangeT = \begin{cases} \left[T_f + \frac{\Delta T}{2}, T_f + \frac{3\Delta T}{2}\right] & \text{(clockwise rotation)} \\ \left[T_f - \frac{3\Delta T}{2}, T_f - \frac{\Delta T}{2}\right] & \text{(counterclockwise rotation)} \end{cases}$$

wherein Tf is a base point of a tool surface angle.
Further, the fitness function is expressed as:

$$\begin{cases} f_x = \text{abs}((\cos A \cos I \cos T - \sin A \sin T)B_N + \\ \quad (-\sin A \sin I \cos T - \cos A \sin T)B_w + \sin I \cos T B_S - b_x) \\ f_y = \text{abs}((\cos A \cos I \sin T + \sin A \cos T)B_N + \\ \quad (-\sin A \cos I \sin T + \cos A \cos T)B_w + \sin I \sin T B_S - b_y) \\ f_x = \text{abs}((-\cos A \sin I)B_N + (\sin A \sin I)B_w + \cos I B_S - b_z) \end{cases};$$

wherein A is an azimuth angle, I is a inclination angle, T is a tool surface angle, and $b_x$, $b_y$, $b_z$ are triaxial data measured by a fluxgate three-component meter; Bs is a vertical upward component of a geomagnetic field, Bn is a geographical northward component of the geomagnetic field, and Bw is a geographical westward component of the geomagnetic field; fx, fy and fz are sub-fitness functions, and solution is completable by only solving one of the fitness functions under a specific condition; abs( ) is an absolute value function and is used for calculating an error between a theoretical value and a measured value; and when a set of Euler angle combinations is provided to enable values of all the sub-fitness functions to be 0, it is determined that the set of Euler angles is a real attitude of the drilling tool.

Further, the updating a speed and a position of each particle, and gradually moving the particles closer to an optimal position by adopting an iteration method includes: calculating a fitness function of an individual initial particle;
taking the current position as a historical optimal position pb of a particle individual, and taking a position of a particle with the minimum fitness function as a historical optimal position gb of a swarm;
in subsequent iterations, comprehensively adjusting a search speed and direction according to the current speed v and current position x of the particle and a distance between pb and gb, a speed variation formula being expressed as:

$$v(t+1) = wv(t) + c1r1[pb(t) - x(t)] + c2r2(t)[pg(t) - x]$$

a position updating formula being expressed as:

$$x(t+1) = x(t) + v(t+1)$$

wherein in the formula, v is an individual speed of the particle, and w, c1 and c2 are all weight parameters of which values are 0-2.

According to another aspect of the present disclosure, provided is a solving system for an Euler angle attitude, including: an acquisition unit, the acquisition unit being configured to acquire a rough rotation angle ΔT of a tool surface of a drilling tool in a search range; and a calculation unit, the calculation unit being configured to perform calculation according to the rough rotation angle ΔT to obtain a variation range RangeT of the tool surface; the calculation unit being further configured to dispose a plurality of particles within the variation range RangeT, correspond position coordinates of the particles to an Euler angle value, randomly generate initial speeds of the particles, calculate a fitness function of each particle, and select the particle with the minimum fitness function as an optimal particle; update a speed and a position of each particle, and gradually move the particles closer to an optimal position by adopting an iteration method; and after performing n iterations until the precision of the fitness function of the optimal particle reaches a threshold, that is, the position of the particle is the optimal position, stop iteration, and at the moment, take a position of a first particle as a real attitude parameter of the drilling tool; wherein the optimal position is a position where the value of the fitness function is less than the threshold.

According to further aspect of the present disclosure, provided is a computer-readable storage medium, having a computer program stored thereon, wherein when the program is executed by a processor, the method of any one of the above-mentioned technical solutions is implemented.

According to yet further aspect of the present disclosure, provided is an electronic device, including one or more processors; and a storage apparatus configured to store one or more programs, when the one or more programs are executed by the one or more processors, the method of any one of the above-mentioned technical solutions being implemented.

(3) Beneficial Effects

The above-mentioned technical solution of the present disclosure has the following beneficial technical effects:
the solving method for the Euler angle attitude in the present disclosure can be used for solving three-dimensional attitude parameters of the drilling tool only by means of measured data from a fluxgate three-component meter. During search of an optimal value solution, the search speed and direction of this algorithm can be automatically adjusted according to historical search information so as to be more rapidly converged to an extreme point. The calculated quantity of solution cannot be exponentially increased with a solution precision, and thus, double requirements on high precision and high efficiency can be satisfied.

BRIEF DESCRIPTION OF DRAWINGS

FIG. 1 is a flow diagram of a solving method for an Euler angle attitude according to an implementation of the present disclosure.

DETAILED DESCRIPTION OF THE EMBODIMENTS

In order to make objectives, technical solutions and advantages of the present disclosure clearer and more understandable, the present disclosure will be further described in detail below in conjunction with specific implementations and with reference to the accompanying drawings. It should be understood that these descriptions are only exemplary, but are not intended to limit the scope of the present disclosure. In addition, in the following description, descriptions for known structures and technologies are omitted to avoid unnecessary confusion among concepts in the present disclosure.

The accompanying drawings show a schematic diagram of a layer structure according to an embodiment of the present disclosure. These drawings are not drawn in proportion, wherein for a purpose of clarity, some details are enlarged, and some details may be omitted. Shapes of various areas and layers shown in the drawings as well as their relative sizes and position relationships are only exemplary, and in practice, there may be deviations due to manufacturing tolerances or technical limitations. Moreover, areas/layers with different shapes, sizes and relative positions may be additionally designed as actually required by the skilled in the art.

Obviously, the described embodiments are a part of the embodiments of the present disclosure, but not all the embodiments. Based on the embodiments of the present disclosure, all other embodiments obtained by those of ordinary skill in the art without creative work fall within the protection scope of the present disclosure.

In addition, technical features described below and involved in different implementations of the present disclosure can be combined with each other without conflicts.

The present disclosure will be described in more detail below with reference to the accompanying drawings. In each of the accompanying drawings, the same element is represented by adopting a similar numeral in the accompanying drawings. For the sake of clarity, each part in the accompanying drawings is not drawn in proportion.

FIG. 1 is a flow diagram of a solving method for an Euler angle attitude according to an implementation of the present disclosure.

As shown in FIG. 1, in an embodiment of the present disclosure, provided is a solving method for an Euler angle attitude, including: a rough rotation angle ΔT of a tool surface of a drilling tool in a search range is acquired; calculation is performed according to the rough rotation angle ΔT to obtain a variation range RangeT of the tool surface; a plurality of particles are disposed within the variation range RangeT, position coordinates of the particles correspond to an Euler angle value, initial speeds of the particles are randomly generated, a fitness function of each particle is calculated, and the particle with the minimum fitness function is selected as an optimal particle; a speed and a position of each particle are updated, and the particles are gradually moved closer to an optimal position by adopting an iteration method; and after n iterations are performed until the precision of the fitness function of the optimal particle reaches a threshold, that is, the position of the particle is the optimal position, iteration is stopped, and at the moment, a position of a first particle is taken as a real attitude parameter of the drilling tool; wherein the optimal position is a position where the value of the fitness function is less than the threshold. The solving method for the Euler angle attitude in the present disclosure can be used for solving three-dimensional attitude parameters of the drilling tool only by means of measured data from a fluxgate three-component meter. During search of an optimal value solution, the search speed and direction of this algorithm can be automatically adjusted according to historical search information so as to be more rapidly converged to an extreme point. The calculated quantity of solution cannot be exponentially increased with a solution precision, and thus, double requirements on high precision and high efficiency can be satisfied.

It should be noted that the position coordinates are attitude parameters of the drilling tool, i.e., Euler angles A\N\T which are coordinates of a carrier.

In an optional embodiment, the particles include fixed particles and random particles; the fixed particles are disposed in the center and on endpoints of the search range; and the random particles are randomly generated in the search range.

In an optional embodiment, the step that a rough rotation angle ΔT of a tool surface of a drilling tool in a search range is acquired includes: a rough rotation angle ΔT is acquired according to a rotating speed v of the drilling tool;

a specific formula being expressed as:

$$\Delta T = v * \frac{60}{f};$$

wherein f is a sampling frequency.

In an optional embodiment, the step that calculation is performed according to the rough rotation angle ΔT to obtain a variation range RangeT of the tool surface includes: calculation is performed according to the rough rotation angle ΔT and an angle Tf before rotation to obtain the variation range RangeT of the tool surface.

In an optional embodiment, a calculation formula may include:

$$RangeT = \begin{cases} \left[T_f + \frac{\Delta T}{2}, T_f + \frac{3\Delta T}{2}\right] & \text{(clock wise rotation)} \\ \left[T_f - \frac{3\Delta T}{2}, T_f - \frac{\Delta T}{2}\right] & \text{(counter clock wise rotation)} \end{cases}$$

wherein Tf is a base point of a tool surface angle, i.e., a solution result of a tool angle at a previous sampling point.

In an optional embodiment, the fitness function is expressed as:

$$\begin{cases} f_x = \text{abs}((\cos A \cos I \cos T - \sin A \sin T)B_N + \\ \qquad (-\sin A \sin I \cos T - \cos A \sin T)B_w + \sin I \cos T B_S - b_x) \\ f_y = \text{abs}((\cos A \cos I \sin T + \sin A \cos T)B_N + \\ \qquad (-\sin A \cos I \sin T + \cos A \cos T)B_w + \sin I \sin T B_S - b_y) \\ f_x = \text{abs}((-\cos A \sin I)B_N + (\sin A \sin I)B_w + \cos I B_S - b_z) \end{cases};$$

wherein A is an azimuth angle, I is a inclination angle, T is a tool surface angle, and $b_x$, $b_y$, $b_z$ are triaxial data measured by a fluxgate three-component meter; Bs is a vertical upward component of a geomagnetic field, Bn is a geographical northward component of the geomagnetic field, and Bw is a geographical westward component of the geomagnetic field; fx, fy and fz are sub-fitness functions, and solution is completable by only solving one of the fitness functions under a specific condition; abs is an absolute value function and is used for calculating an error between a theoretical value and a measured value; and when a set of Euler angle combinations is provided to enable values of all the sub-fitness functions to be 0, it is determined that the set of Euler angles is a real attitude of the drilling tool.

Such a fitness function evaluates a difference of a theoretical value and a measured value of each of three geomagnetic components under any one set of Euler angle combinations in the search range. When a set of Euler angle combinations is provided to enable values of all the sub-fitness functions to be 0, it may be determined that the set of Euler angles is a real attitude of the drilling tool.

In an optional embodiment, the step that a speed and a position of each particle are updated, and the particles are gradually moved closer to an optimal position by adopting an iteration method includes: a fitness function of an individual initial particle is calculated;

the current position is taken as a historical optimal position pb of a particle individual, and a position of a particle with the minimum fitness function is taken as a historical optimal position gb of a swarm; and then, a search speed and direction are comprehensively adjusted according to the current speed v and current position x of the particle and a distance between pb and gb, a speed variation formula being expressed as:

$$v(t+1) = wv(t) + c1r1[pb(t) - x(t)] + c2r2(t)[pg(t) - x]$$

a position updating formula being expressed as:

$$x(t+1) = x(t) + v(t+1)$$

wherein in the formula, v is an individual speed of the particle, and w, c1 and c2 are all weight parameters of which values are 0-2.

In the present application, the measurement for the attitude parameters of the drilling tool is divided into three states. A first state is dynamic measurement, at the moment, the drilling tool is in an unknown movement state, all of A, I and T may change, and therefore, the three angles need to be solved at the same time, and each of solution results is a base point of an Euler angle and is used as a reference value for solving other states. A second state is also dynamic measurement, however, one of parameters A and I is known, that is, the drilling tool is steering or deflecting at the moment, and therefore, according to the base point of the Euler angle provided in the first state, the Euler angle combination A-T or I-T is solved in a new search range, and the base point is updated. A third state is measurement for the drilling tool in a steady state, A and I are kept unchanged when the drilling tool is in the steady state, and therefore, it is only necessary to solve T and update the base point of the tool surface angle.

In order to reduce a search range in each state, a rough rotation angle $\Delta T$ of the tool surface within the search range can be obtained according to information such as a rotating speed v (rpm), a rotation direction, a base point Tf(°) of the tool surface angle and a sampling frequency f(Hz) of the drilling tool, and then, a possible range RangeT of a sampling point T may be obtained.

When working in a well, the drilling tool is in the third state within most of the time. Even if the drilling tool is steering or deflecting, due to little change of the deviation angle and the azimuth angle within a sampling interval (the sampling frequency is at a hundred-hertz level), the drilling tool can be considered to be in a straightly-moving state within a short period of time. Therefore, it is unnecessary to perform solution for sampling every time in the first state and the second state. The search ranges Range A and RangeT of A and T needed in the first state and the second state depend on the deflecting ability of the drilling tool and a measurement time interval, and are usually widened for a certain angle from the center of the base point to both ends, and the widened angle depends on the strength of the deflecting ability of the drilling tool.

In the present application, a process of table look-up search in the above-mentioned numerical solution is optimized based on a particle swarm optimization algorithm. Firstly, a fitness function set is set. Parameters A, I and T are adjusted, and the fitness functions are calculated, and when results are closer to 0, it is proven that the set of parameters is closer to real attitude parameters of the drilling tool. For the third state, A and I are known, it is only necessary to adjust the parameter T to satisfy the condition that the fitness function fx or fy is close to 0. For the second state, there are two solutions: firstly, a dimensionality reduction way is adopted to find the optimal I (A) by using the fitness function fz and the known A (I), at the moment, the second state can be converted into the first state; and secondly, a set of optimal [A, T] ([I, T]) is directly found on a RangeA-RangeT plane (RangeI-RangeT plane). For the first state, all functions of a fitness function set have to be fully considered, that is, a set of Euler angles that can satisfy all the formulas have to be found within a search range.

A solution space is constructed according to different measurement states, base points and angle search ranges. Then, a plurality of particles are initially disposed, and positions of the particles in the search space are Euler angle combinations.

In the previous application of the particle swarm optimization algorithm, the positions of the particles are random. When a situation that the particles are centralized in a certain area occurs, the particles will not be comprehensively searched to be converged to a local extremum. Therefore, a "fixed-random" particle combination is designed. The particles are divided into two categories. One category refers to fixed particles which are located in the center and on endpoints of the search range. When the search range is larger, the search range may be divided into a plurality of subspaces, and particles are disposed in the centers and endpoints of the subspaces, which ensures the comprehensiveness of the search. The other category refers to random particles. Euler angle combinations are randomly generated in the search range and are used as initial positions x of the particles, which ensures the chaos characteristic of the search. For the problem that the later speed of the particle swarm optimization algorithm is converged too slowly, the upper and lower limits vlimit of the movement speeds of the particles are set according to a precision requirement of parameter solution, and the individual initial movement speeds v of the particles are randomly generated in a movement range.

In the third step, the fitness function of the individual initial particle is calculated, the current position is recorded as the historical optimal position pb of the particle individual, and meanwhile, the position of the particle with the minimum fitness function is taken as the historical optimal position gb of the swarm. The search speed and direction are comprehensively adjusted according to the current position x of the particle and the distance between pb and gb to obtain speed variation data and position data.

At the beginning of iteration, the particles are more dispersed, and the position of the particle is far from the historical optimal position of the swarm. At the moment, the speed is high, which is beneficial to fast search. At the later stage of iteration, the particles are gradually converged, the speeds of the particles are reduced until the lower limit of the speed is reached, and thus, the search precision is improved.

Iterations are performed in sequence, the historical optimal position of the particle individual and the historical optimal position of the swarm are updated, each particle gradually moves closer to the historical optimal position of the swarm, and thus, the search area is continuously shrunk. After n iterations, each particle is converged on a real attitude of the drilling tool until the fitness function of a certain particle satisfies a precision requirement, then, the search is stopped, and the position of the particle is taken as the real attitude parameter of the drilling tool.

In order to test a calculation efficiency and precision based on a particle swarm search algorithm, a comparison test is performed on the particle swarm optimization algorithm and a traditional equal-step-length table look-up method in different states, and in all the following tests, programs are compiled by using MATLAB and run on the same computer.

Firstly, for a test in the first state, the rotating speed of the drilling speed is 200 rpm, the sampling frequency is 100 Hz, base points are A=30°, I=30°, and T=45°, the drilling tool rotates clockwise, and therefore, the current existence rang of T is RangeT=[51°, 67°] within which 1000 angle values are randomly generated as real attitudes of the drilling tool. Similar value calculation methods are adopted in the following tests. Two algorithms are adopted for solving and verifying 1000 tool surface angles, solution time comparison under different precision requirements is counted, and results are shown as the following table:

TABLE 1 comparison table for solution time in first state under different precisions (per thousand times)

| Precision | One digit after the decimal point | Two digits after the decimal point | Higher precision |
|---|---|---|---|
| PSO search algorithm | 0.008044 s | 0.023337 s | 0.035023 s |
| Equal-step-length traversal algorithm | 0.010497 s | 0.082004 s | 0.161605 s |
| Proportion | 0.77 | 0.28 | 0.21 |

Comparison test is further performed on solution time of the two algorithms at different rotating speeds, the sampling frequency is 100 Hz, the two digits after the decimal point are required in precision, S and a comparison result is shown as the following table:

TABLE 2 comparison table for solution time in first state at different rotating speeds (per thousand times)

| Rotating speed | 100 rpm | 200 rpm | 300 rpm |
|---|---|---|---|
| PSO search algorithm | 0.001550 s | 0.023337 s | 0.002545 s |
| Equal-step-length traversal algorithm | 0.006281 s | 0.082004 s | 0.014712 s |
| Proportion | 0.26 | 0.28 | 0.17 |

It can be seen from the above-mentioned two tables that a sampling PSO optimized search algorithm has higher efficiency than the equal-step-length table look-up method regardless of high precision or high rotating speed. In equal-step-length traversal, the solution time will be prolonged in a corresponding proportion with precision improvement or search range increase. For the PSO search algorithm, it is only necessary to control the search ranges and the minimum movement speeds of the particles to ensure that the speed is reduced to satisfy the precision requirement at the later stage of the search, without affecting the high-speed search at the early stage. Therefore, in the search with a higher precision and a wider range, the PSO search algorithm has more advantages. The practicability of the numerical solution is increased. In addition, comparison test is further performed in the second state and the third state. During test in the second state, it is set that A is unchanged, a variation range of I is 2°, the sampling frequency is 100 Hz, the rotating speed and the measurement precision are changed, and comparison results are shown as follows. The PSO search algorithm has great advantages, especially, when two digits after the decimal point are required in precision. The traditional algorithm takes a lot of time and has the average calculation time per step of 0.07 s which has exceeded the sampling interval (100 Hz), and therefore, it cannot play a role in actual production. The average calculation time per step of the PSO search algorithm is 0.0007 s, the calculation efficiency is increased by two orders of magnitude, and therefore, even if the rotating speed is 200 rpm, it is still high in calculation efficiency.

TABLE 3

Comparison table for solution time in second state under different parameters (per thousand times)

| Parameter | One digit after the decimal point Rotating speed 100 rpm | One digit after the decimal point Rotating speed 200 rpm | Two digit after the decimal point Rotating speed 100 rpm | Two digit after the decimal point Rotating speed 200 rpm |
|---|---|---|---|---|
| PSO search algorithm | 0.039938 s | 0.048809 | 0.073800 s | 0.089573 |
| Traditional traversal algorithm | 0.717970 s | 1.426947 | 69.119561 s | ~ |

In the third state, it is set in the test that search ranges of A and I are both 2°, the rotating speed is 100 rpm, an integer bit is required in precision, and the sampling frequency is 100 Hz. During test, the average calculation time per step of the PSO search algorithm is 0.00057 s, while the traditional traversal algorithm takes 0.016 s per step, which can no longer satisfy the efficiency requirement of the search. At a higher rotating speed, the search range becomes larger, and the fitness function has a plurality of extreme points within the search area, which leads to a decrease in search precision, and thus, search performed by using the numerical solution is no longer applicable.

It can be seen from the above-mentioned tests that, by using the PSO search algorithm, the calculation efficiency of numerical solution is greatly increased, and high-precision numerical solution can be completed within the sampling interval.

In another embodiment of the present disclosure, provided is a solving system for an Euler angle attitude, which may include: an acquisition unit, the acquisition unit being configured to acquire a rough rotation angle $\Delta T$ of a tool surface of a drilling tool in a search interval; and a calculation unit, the calculation unit being configured to perform calculation according to the rough rotation angle $\Delta T$ to obtain a variation range RangeT of the tool surface; the calculation unit being further configured to dispose a plurality of particles within the variation range RangeT, correspond position coordinates of the particles to an Euler angle value, randomly generate initial speeds of the particles, calculate a fitness function of each particle, and select the particle with the minimum fitness function as an optimal particle; update a speed and a position of each particle, and gradually move the particles closer to an optimal position by adopting an iteration method; and after performing n iterations until the precision of the fitness function of the optimal particle reaches a threshold, that is, the position of the particle is the optimal position, stop iteration, and at the moment, take a position of a first particle as a real attitude parameter of the drilling tool; wherein the optimal position is a position where the value of the fitness function is less than the threshold.

In further embodiment of the present disclosure, provided is a computer-readable storage medium, having a computer program stored thereon, wherein when the program is executed by a processor, the method of any one of the above-mentioned technical solutions is implemented.

In yet further embodiment of the present disclosure, provided is an electronic device, including: one or more processors; and a storage apparatus configured to store one or more programs, when the one or more programs are executed by the one or more processors, the method of any one of the above-mentioned technical solutions being implemented.

The present disclosure aims at protecting a resolving method and system for an Euler angle attitude. The solving method for the Euler angle attitude may include: a rough rotation angle ΔT of a tool surface of a drilling tool in a search interval is acquired; calculation is performed according to the rough rotation angle ΔT to obtain a variation range RangeT of the tool surface; a plurality of particles are disposed within the variation range RangeT, position coordinates of the particles correspond to an Euler angle value, initial speeds of the particles are randomly generated, a fitness function of each particle is calculated, and the particle with the minimum fitness function is selected as an optimal particle; a speed and a position of each particle are updated, and the particles are gradually moved closer to an optimal position by adopting an iteration method; and after n iterations are performed until the precision of the fitness function of the optimal particle reaches a threshold, that is, the position of the particle is the optimal position, iteration is stopped, and at the moment, a position of a first particle is taken as a real attitude parameter of the drilling tool; wherein the optimal position is a position where the value of the fitness function is less than the threshold. The solving method for the Euler angle attitude in the present disclosure can be used for solving three-dimensional attitude parameters of the drilling tool only by means of measured data from a fluxgate three-component meter. During search of an optimal value solution, the search speed and direction of this algorithm can be automatically adjusted according to historical search information so as to be more rapidly converged to an extreme point. The calculated quantity of solution cannot be exponentially increased with a solution precision, and thus, double requirements on high precision and high efficiency can be satisfied.

It should be understood that the above-mentioned specific implementations of the present disclosure are only intended to exemplarily describe or explain the principle of the present disclosure, rather than to constitute limitations on the present disclosure. Therefore, any modifications, equivalent substitutions, improvements, etc. made without departing from the spirit and scope of the present disclosure should fall within the protection scope of the present disclosure. In addition, the appended claims of the present disclosure are intended to include all the changes and modifications that fall within the scope and boundary of the appended claims or equivalent forms of such a scope and boundary.

What is claimed is:

1. A method for controlling a drilling tool based on an Euler angle attitude of the drilling tool, comprising:
   acquiring a rough rotation angle ΔT of a tool surface of the drilling tool in a search interval;
   performing calculation according to the rough rotation angle ΔT and a base point Tf of a tool surface angle before rotation to obtain a variation range RangeT of the tool surface;
   disposing a plurality of particles within the variation range RangeT, wherein the particles comprise fixed particles disposed in a center and on endpoints of the search interval and random particles randomly generated in the search interval;
   corresponding position coordinates of the particles to the Euler angle value comprising an azimuth angle A, an inclination angle I, and a tool surface angle T that represent a three-dimensional attitude of the drilling tool;
   randomly generating initial speeds of the particles within a speed limit range determined by a precision requirement;
   calculating a fitness function of each particle based on triaxial data bx, by, bz measured by a fluxgate three-component meter and geomagnetic field components Bs, Bn, Bw, wherein the fitness function evaluates a difference between theoretical values and measured values of the triaxial data under the Euler angle values;
   selecting the particle with the minimum fitness function value as an optimal particle;
   iteratively updating a speed and a position of each particle according to a speed variation formulas:

$$v(t+1) = wv(t) + c1r1[pb(t) - x(t)] + c2r2(t)[pg(t) - x]$$

and a position updating formula:

$$x(t+1) = x(t) + v(t+1)$$

wherein v is an individual speed of the particle, x is a current position of the particle, pb is a historical optimal position of the particle individual, gb is a historical optimal position of a swarm, w, c1 and c2 are weight parameters having values between 0-2;
   gradually moving the particles closer to an optimal position by repeating the iteratively updating step, the optimal position being a position of the optimal particle when the precision of the fitness function of the optimal particle reaches a threshold, wherein the precision of the fitness function of the optimal particle reaches a threshold indicates that a fitness function value of the optimal particle is less than the threshold; and
   upon the precision of the fitness function of the optimal particle reaches the threshold, stopping the iteratively updating step and taking the optimal position of the optimal particle as real attitude parameters comprising the azimuth angle A, the inclination angle I, and the tool surface angle T of the drilling tool; and
   performing attitude control of the drilling tool and tracking control of a wellbore track based on the real attitude parameters during the drilling operations.

2. The solving method for the Euler angle attitude of claim 1, wherein the acquiring the rough rotation angle ΔT of the tool surface of the drilling tool in the search interval comprises:
   acquiring the rough rotation angle ΔT according to a rotating speed v of the drilling tool;
   a specific formula being expressed as:

$$\Delta T = v * \frac{60}{f};$$

wherein f is a sampling frequency.

3. The solving method for the Euler angle attitude of claim 1, wherein a calculation formula comprises:

$$RangeT = \begin{cases} \left[T_f + \frac{\Delta T}{2}, T_f + \frac{3\Delta T}{2}\right] & \text{(clock wise rotation)} \\ \left[T_f - \frac{3\Delta T}{2}, T_f - \frac{\Delta T}{2}\right] & \text{(counter clock wise rotation)} \end{cases}.$$

4. The solving method for the Euler angle attitude of claim 1, wherein the fitness function is expressed as:

$$\begin{cases} f_x = \text{abs}((\cos A \cos I \cos T - \sin A \sin T)B_N + \\ \quad (-\sin A \sin I \cos T - \cos A \sin T)B_w + \sin I \cos T B_S - b_x) \\ f_y = \text{abs}((\cos A \cos I \sin T + \sin A \cos T)B_N + \\ \quad (-\sin A \cos I \sin T + \cos A \cos T)B_w + \sin I \sin T B_S - b_y) \\ f_x = \text{abs}((-\cos A \sin I)B_N + (\sin A \sin I)B_w + \cos I B_S - b_z) \end{cases};$$

wherein A is the azimuth angle, I is the inclination angle, T is the tool surface angle, and bx, by, bz are the triaxial data measured by the fluxgate three-component meter; Bs is a vertical upward component of a geomagnetic field, Bn is a geographical northward component of the geomagnetic field, and Bw is a geographical westward component of the geomagnetic field; fx, fy and fz are sub-fitness functions, and solution is completable by only solving one of the fitness functions under a specific condition; abs is an absolute value function and is used for calculating an error between a theoretical value and a measured value; and when a set of Euler angle combinations is provided to enable values of all the sub-fitness functions to be 0, it is determined that the set of Euler angles is a real attitude of the drilling tool.

5. The solving method for the Euler angle attitude of claim 1, wherein the updating a speed and a position of each particle, and gradually moving the particles closer to an optimal position by adopting an iteration method comprises:

calculating a fitness function of an individual initial particle; taking the current position as a historical optimal position pb of a particle individual, and taking a position of a particle with the minimum fitness function as a historical optimal position gb of a swarm;

in subsequent iterations, comprehensively adjusting a search speed and direction according to the current speed v and current position x of the particle and a distance between pb and gb, wherein in the formula, v is an individual speed of the particle, and w, c1 and c2 are all weight parameters of which values are 0-2.

6. A non-transitory computer-readable storage medium, having a computer program stored thereon, wherein when the program is executed by a processor, the method of claim 1 is implemented.

7. An electronic device, comprising:
one or more processors; and
a storage apparatus configured to store one or more programs, when the one or more programs are executed by the one or more processors, the method of claim 1 being implemented.

* * * * *